April 8, 1958 A. L. GAGNIER 2,830,174
AUTOMOBILE HEADLIGHT GLARE GUARD
Filed July 30, 1956
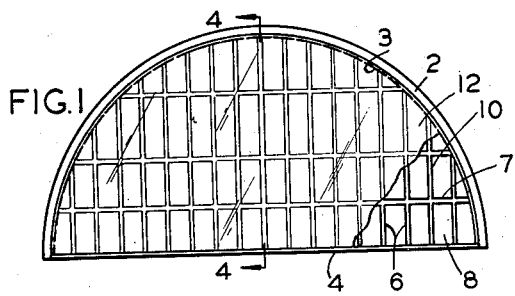
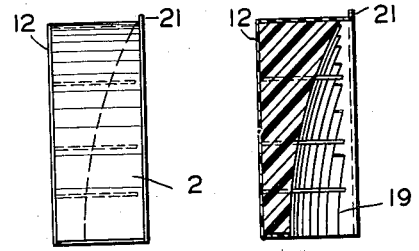
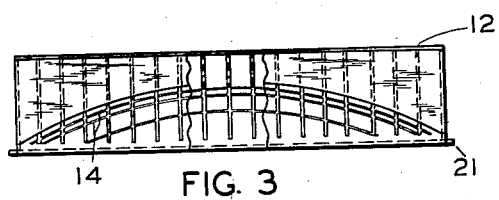
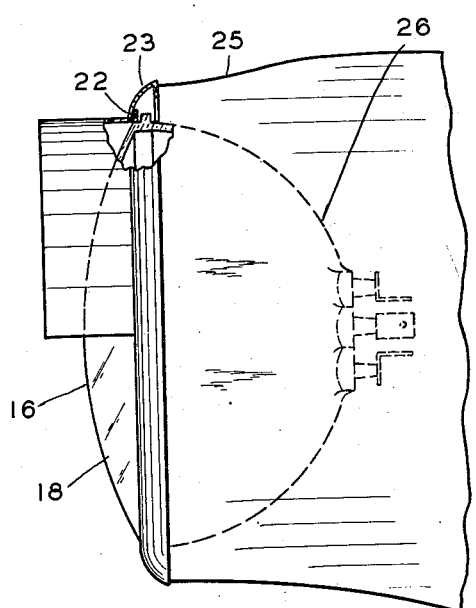
INVENTOR.
Arthur L. Gagnier
BY Scott L. Norviel
Atty

United States Patent Office 2,830,174
Patented Apr. 8, 1958

2,830,174

AUTOMOBILE HEADLIGHT GLARE GUARD

Arthur L. Gagnier, Phoenix, Ariz.

Application July 30, 1956, Serial No. 600,909

1 Claim. (Cl. 240—46.39)

This invention concerns a headlight glare guard for automobiles.

One of the objects of the device is to provide a glare guard which may be easily applied to the conventional headlight of an automobile and will prevent spreading of the light beyond desired limits and confine it to forward trending beams.

Another object of the invention is to provide a glare guard which may be easily attached to and detached from an automobile headlight of the type having a sealed beam light bulb held in place by a bezel; the glare guard having a semi-circular top provided with a flange adapted to be secured under the bezel which holds the light in place;

Still another object is to provide a glare guard having a semi-circular top and a flat bottom with a number of vertical and horizontal slats of opaque material, between said top and bottom which form cells to direct the rays from the headlight in parallel forward beams, and tend to eliminate side or stray beams which extend beyond the bounds of predetermined areas to be illuminated.

A still further object of the invention is to provide a glare guard device, as above described, wherein the slats which cross each other have their rear edges curved to fit tightly against the front face of the headlight lens and conform to its curvature both vertically and horizontally.

Still another object is to provide a removable glare guard having a semi-cylindrical shaped body wherein there are a number of rectangular light directing cells formed by horizontal and vertical slat members having rear edges conforming to the face of the headlight to which the guard is applied and provided with a transparent membrane at the front.

Other objects will appear hereinafter.

I attain the foregoing objects by means of the construction, devices, and combinations illustrated in the accompanying drawing, in which—

Figure 1 is a front elevation of the glare guard;

Figure 2 is a side elevation thereof;

Figure 3 is a bottom view thereof with portions broken away to show interior construction;

Figure 4 is a sectional view thereof taken substantially on line 4—4 of Figure 1; and Figure 5 is a side elevation of the glare guard and an automobile headlight showing the means of installation.

Similar numerals refer to similar parts in the several views.

The body 2 of the glare guard is semi-circular when viewed from the front as in Figure 1 and is enclosed by an arcuate top 3 and a planar bottom piece 4.

As viewed from the side, as in Figure 2, the glare guard appears rectangular in silhouette. Within the body of the guard and between the top cover 3 and the bottom 4 there are a plurality of vertical spacer slats 6 which are intersected by a number of horizontal slats 7. These intersecting slats form rectangular enclosures or cells 8 which, for the purposes herein concerned, may be termed light directing cells.

All the front edges 10 of both horizontal and vertical slats are vertical and lie in one plane which is transverse to the extent of the slats. These front edges are enclosed by a transparent plate or membrane 12. The rear edges of the horizontal slats, as indicated by numeral 14, are curved to conform to and fit against the relative horizontal curvature of the front face 16 of headlight 18. The rear or inner edges 19 of the vertical slats 6 are curved to conform to the vertical curvature of the front lens face 16 of the headlight 18.

Due to the curvature of the inner edges of both the vertical and horizontal slats the device will fit against the front or lens face 16 of the headlight 18 with no appreciable space between its rear edges and the light.

In order to secure the body 2 of the guard to the light structure I provide a radially extending flange 21 at the rear edge of the top surface 3 of the body. This extends outward sufficiently so that it may be caught under the inner lip 22 of the bezel 23 which normally holds the light 18 in place in the front portion of the automobile fender 25. It is to be understood that the headlight 18 as herein shown is of the sealed beam type and that it is secured in the fender 25 and occupies the position indicated by dotted lines 26. The flange 21 is sufficiently narrow and thin so that the bezel is not displaced sufficiently to interfere with its normal holding of the light.

When the automobile light is in use light which is directed forward from the filament and reflected by the parabolic mirror at the rear of the light structure is emitted forward. All angularly straying rays in the upper portion of the light are confined by the light directing cells 8. Both the vertical and horizontal slats are made with sufficient depth so that rays emitted at a greater angle than desired are redirected or cut off so that all rays are emitted forward and confined within a predetermined desired area. Rays emitted from the lower half of the light 18, which is not covered with the guard, have little or no undesirable effect. However, the attachment of this device to the upper half of the light 18 so that it confines the direction of the light rays from this upper half within a predetermined desired area, prevents blinding of drivers of on-coming vehicles by light rays straying from the desired beam area.

The number of slats 6 and 7 used within body 2 is optional and depends on the intensity of the rays emitted by light 18. Where a higher candle power is provided the slats may be more numerous and closer together, and they may be fewer and more widely spaced where lights of low candle power are used. It is also possible to have the slats near the center of the lamp more closely spaced, when desired. In all cases the slats are deep enough so that the cells 13 prevent unwanted dispersal of light rays. As constructed the device is easily attached to ordinary automobile head lights and, when attached, conforms to and becomes a part of the lamp and functions efficiently for the purposes intended.

I claim:

A combined headlight and glare guard therefor comprising a sealed beam bulb including an outwardly curved circular lens, a bezel engaging the outer edge of said bulb for supporting said bulb, a semi-cylindrical top wall having a curvature equal to the circular curvature of said lens, a horizontal flat bottom wall connecting the free ends of said top wall, a plurality of spaced parallel vertical slats extending between said top wall and said bottom wall, a plurality of spaced parallel horizontal slats each extending perpendicularly to said vertical slats from one point on said top wall to another point thereon, said vertical and horizontal slats intersecting to form a plurality of substantially rectangular light directing cells, a radial flange on the rear edge of said top wall projecting perpendicularly outwardly therefrom, said flange engaging in said bezel forwardly of said lens securing said glare shield to said headlight, said glare shield having the forward edges of said top and bottom walls and said vertical and horizontal slats lying in the same plane, and a transparent membrane secured to the forward edges of said walls and said slats, said walls and said slats having the rear edges thereof shaped to conform to the curvature of the forward face of said lens and positioned in contact therewith and said walls and said slats being formed of opaque material.

References Cited in the file of this patent

UNITED STATES PATENTS

| | | |
|---|---|---|
| 1,309,445 | Otte | July 8, 1919 |
| 1,336,951 | Fuligni et al. | Apr. 13, 1920 |
| 1,515,095 | Darsie et al. | Nov. 11, 1924 |
| 2,539,927 | Ramminger | Jan. 30, 1951 |

FOREIGN PATENTS

| | | |
|---|---|---|
| 864,836 | Germany | Jan. 29, 1953 |